Figure 1:
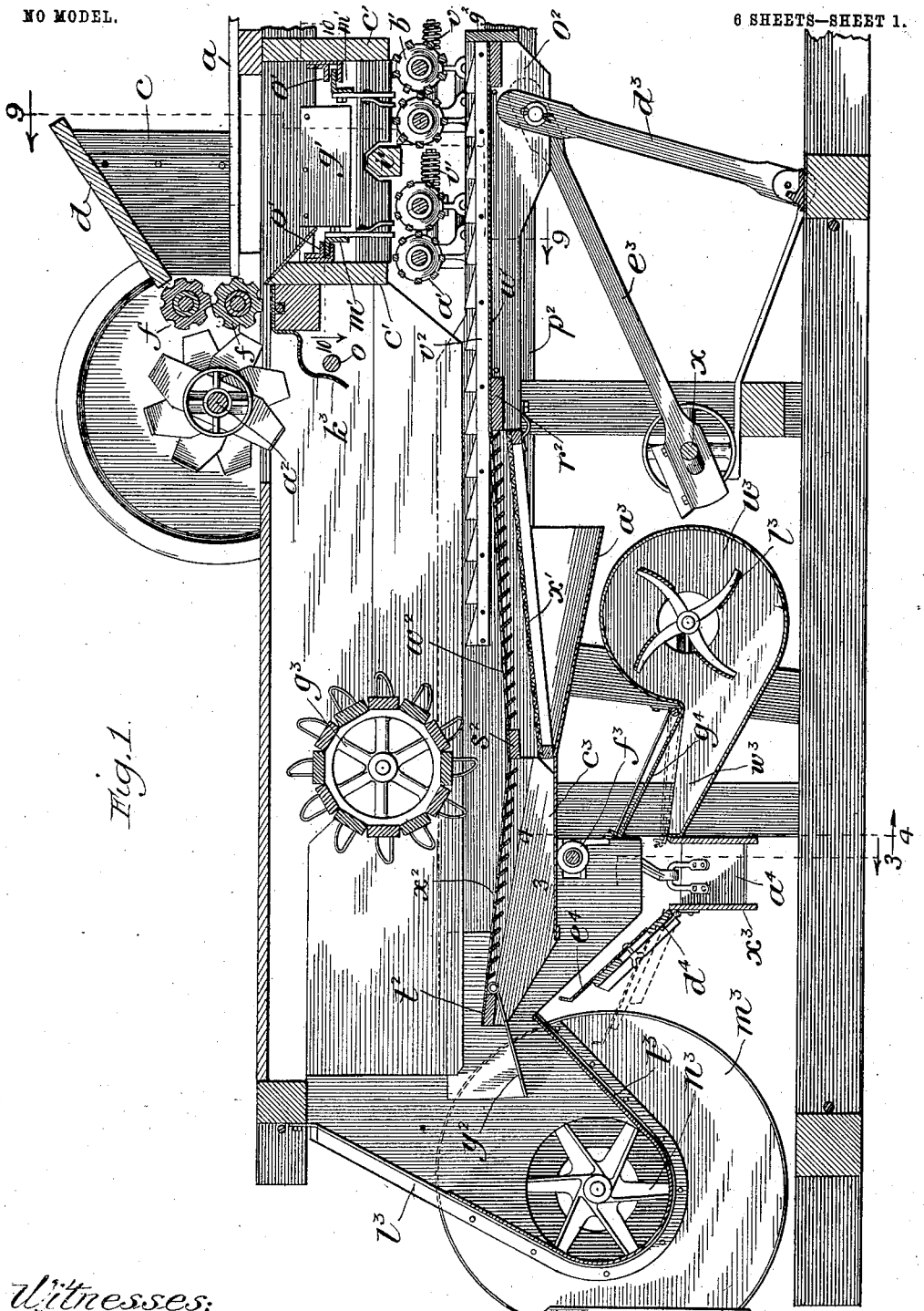

No. 727,300. PATENTED MAY 5, 1903.
C. E. CURTISS.
CORN HUSKER AND SHREDDER.
APPLICATION FILED MAR. 22, 1902.
NO MODEL. 6 SHEETS—SHEET 1.

Witnesses:
Harold G. Barrett
Edw. Barrett

Inventor:
C. E. Curtiss
By his attys.
Poirie & Goldsborough

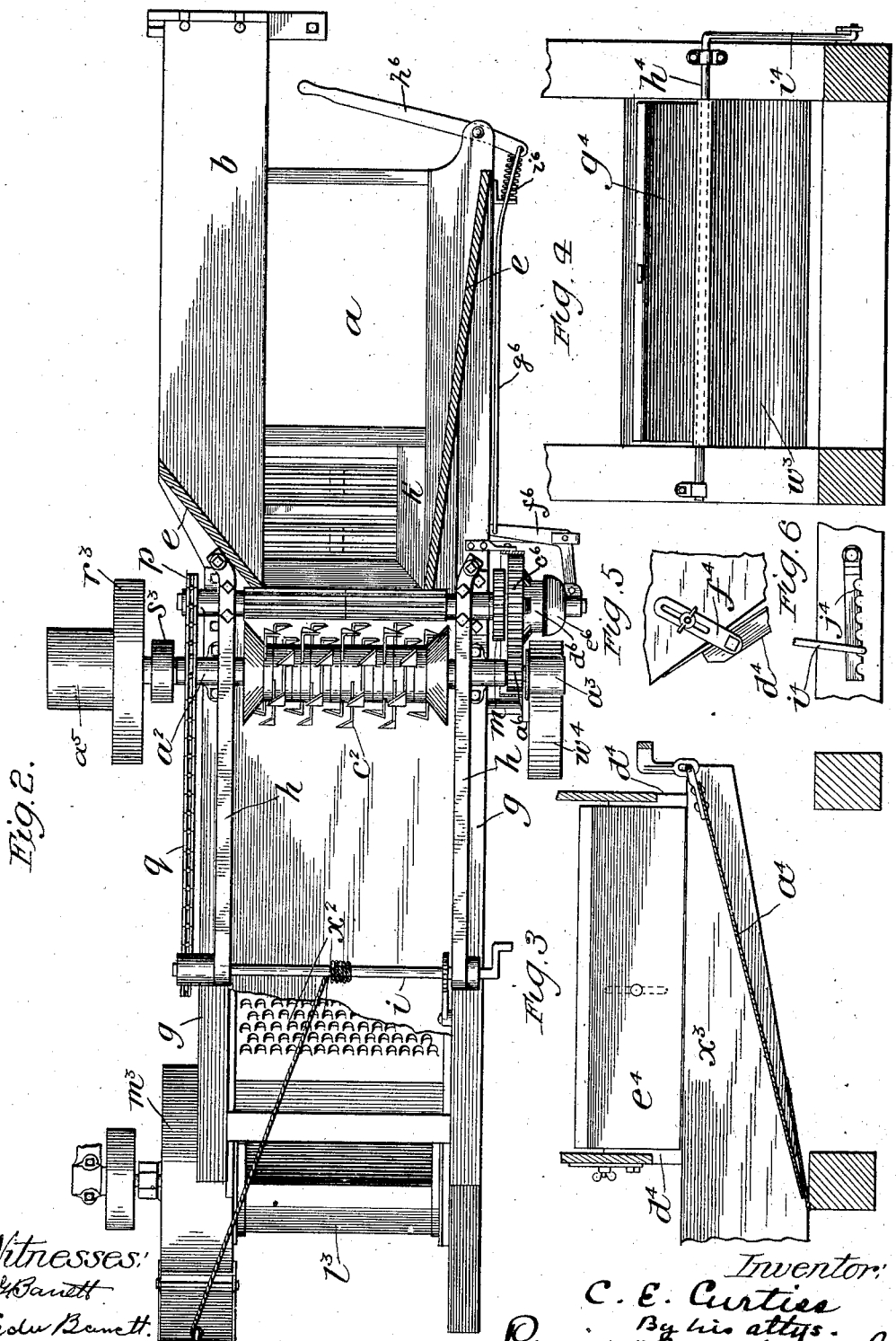

No. 727,300. PATENTED MAY 5, 1903.
C. E. CURTISS.
CORN HUSKER AND SHREDDER.
APPLICATION FILED MAR. 22, 1902.
NO MODEL. 6 SHEETS—SHEET 3.
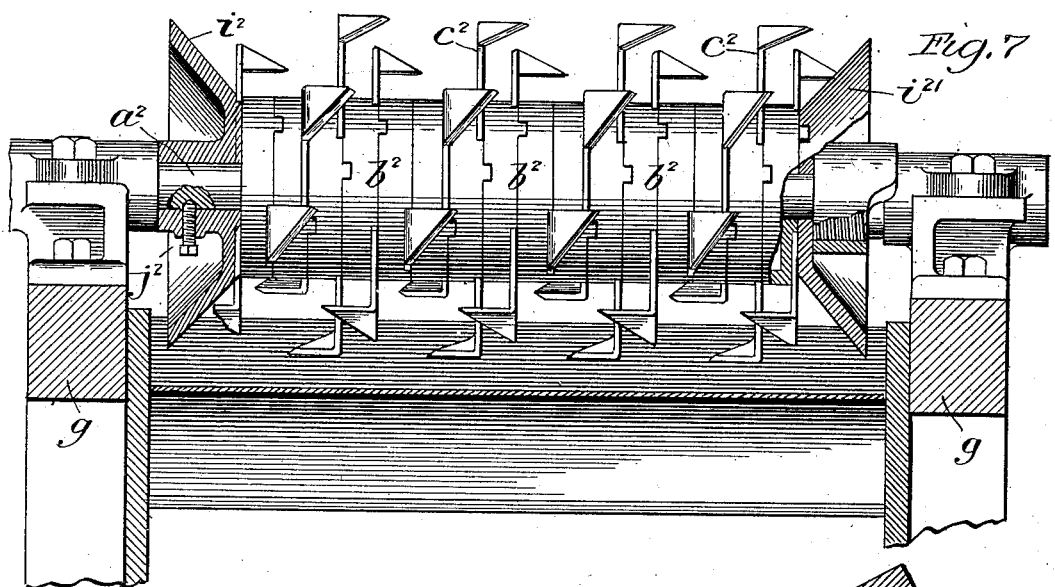
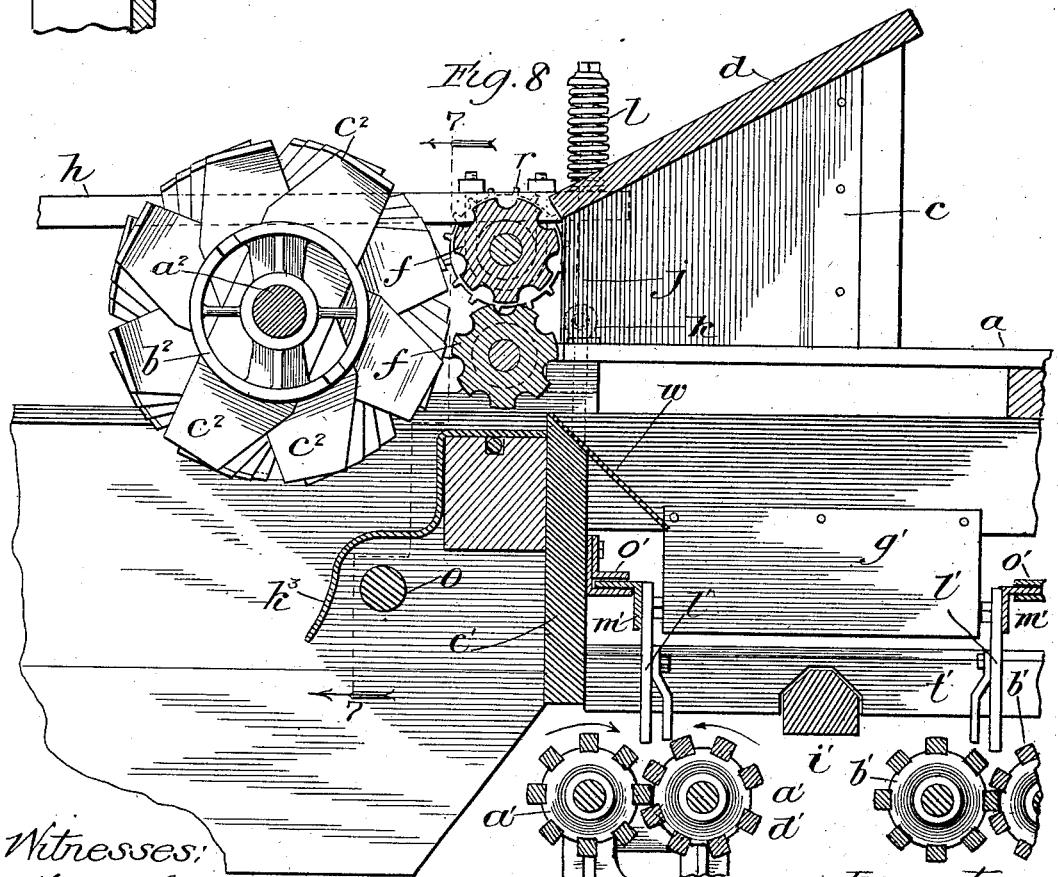

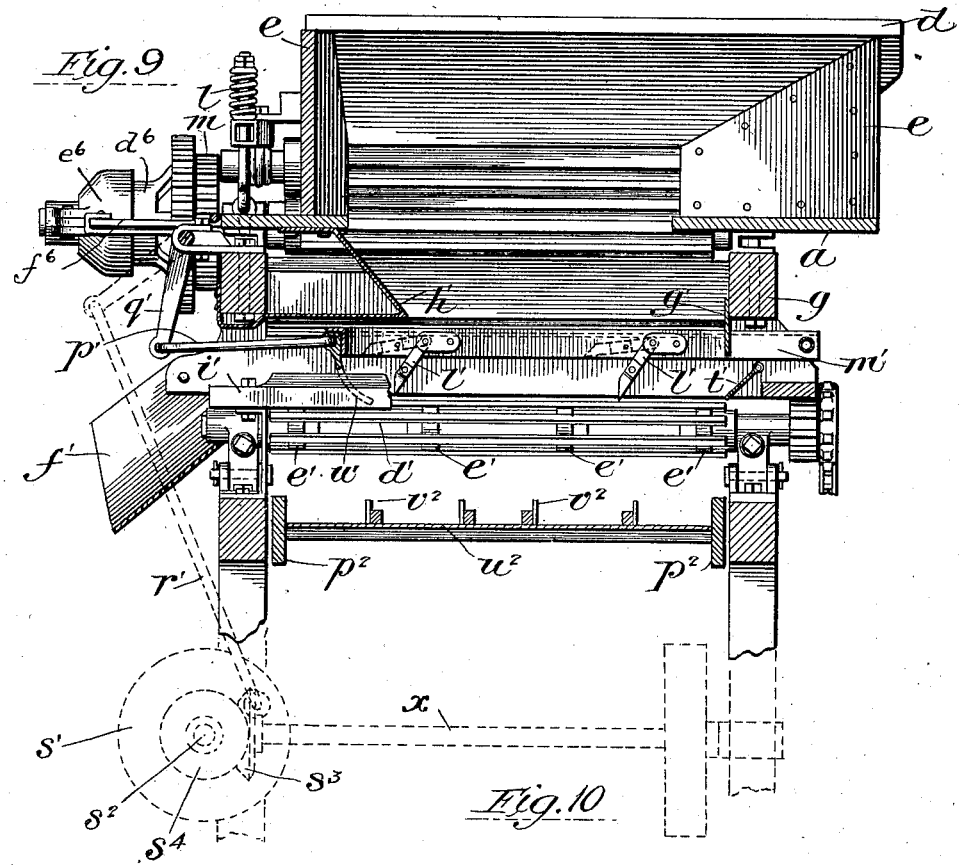
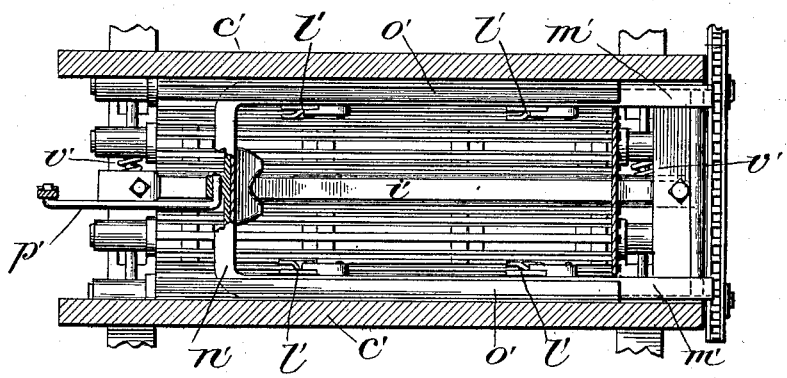

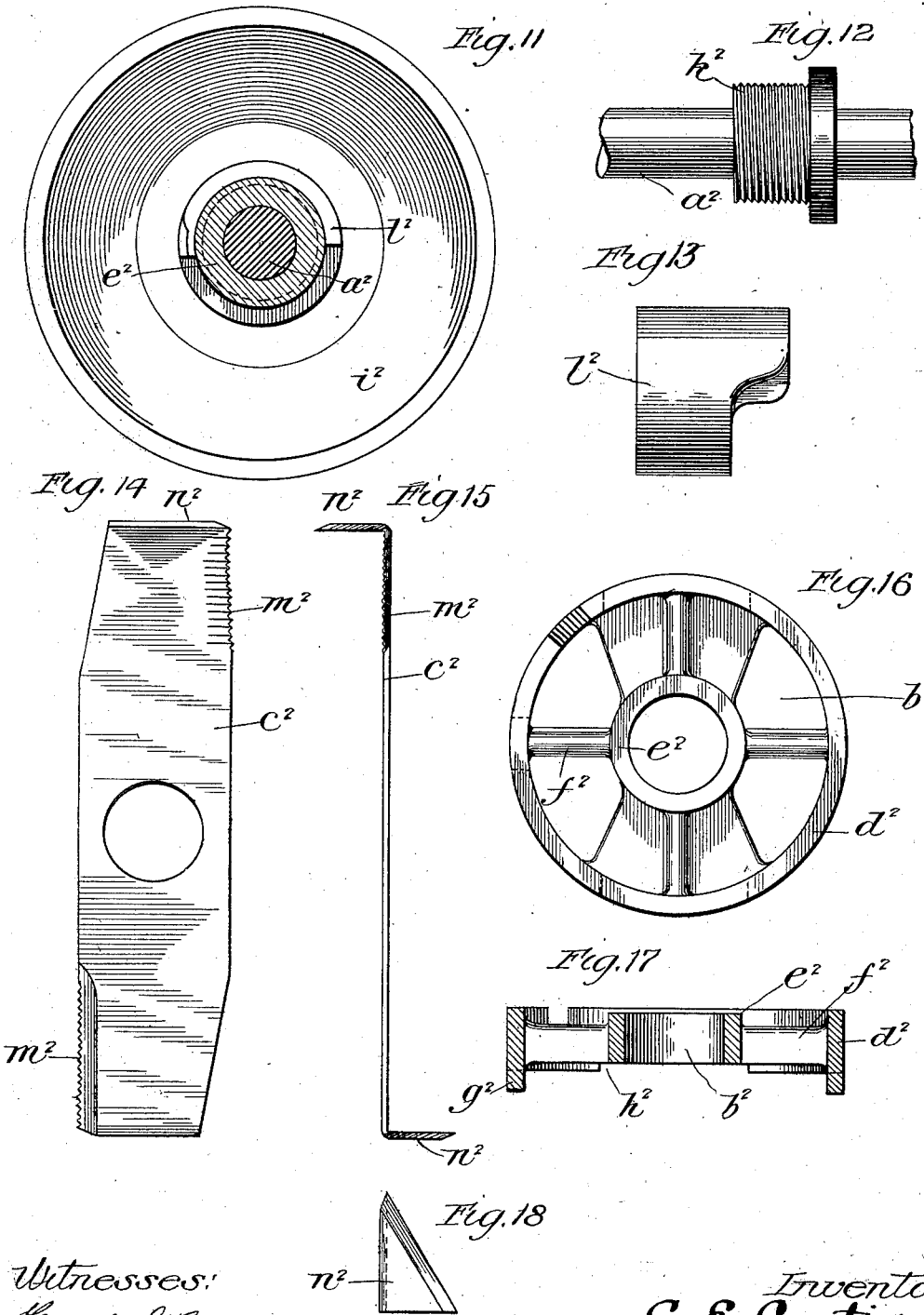

No. 727,300. PATENTED MAY 5, 1903.
C. E. CURTISS.
CORN HUSKER AND SHREDDER.
APPLICATION FILED MAR. 22, 1902.
NO MODEL. 6 SHEETS—SHEET 6.
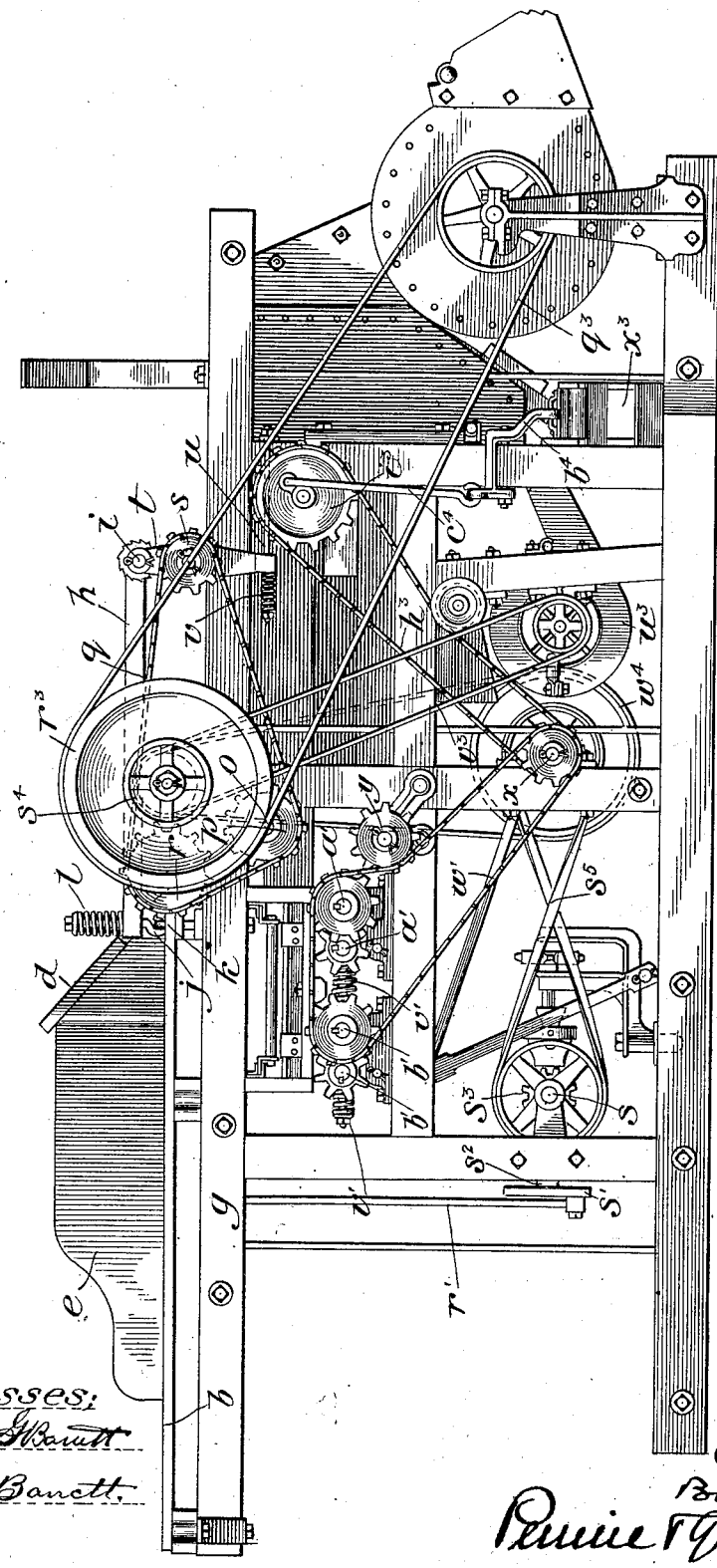
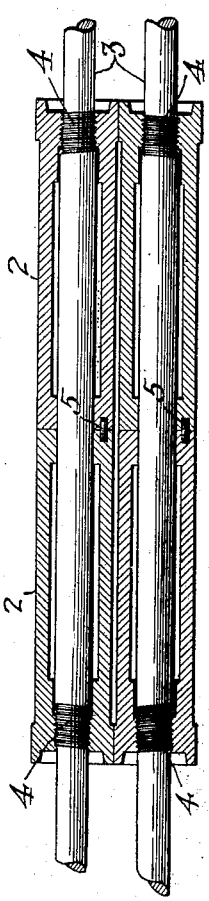
Witnesses:
Inventor
C. E. Curtiss,
By his attys, No. 727,300. Patented May 5, 1903.

UNITED STATES PATENT OFFICE.

CHARLES E. CURTISS, OF CHICAGO, ILLINOIS, ASSIGNOR TO McCORMICK HARVESTING MACHINE COMPANY, OF CHICAGO, ILLINOIS.

CORN HUSKER AND SHREDDER.

SPECIFICATION forming part of Letters Patent No. 727,300, dated May 5, 1903.

Application filed March 22, 1902. Serial No. 99,462. (No model.)

*To all whom it may concern:*

Be it known that I, CHARLES E. CURTISS, a citizen of the United States, residing in Chicago, county of Cook, State of Illinois, have invented certain new and useful Improvements in Corn Huskers and Shredders; and I do hereby declare the following to be a full, clear, and exact description of the invention, such as will enable others skilled in the art to which it appertains to make and use the same.

The invention relates to that class of machines into which the stalks are fed endwise between rolls that snap off the ears and pass them on to the other rolls, where they are husked, the stalks being simultaneously fed forward to a revolving cylinder provided with knives that slit or shred them longitudinally and also cut them up into small pieces suitable for feed for stock.

The object of the invention is to simplify and strengthen the whole structure and to enhance the general efficiency of the machine with particular reference to removing the husks from the ears without shelling the corn and at the same time to provide for saving what corn is unavoidably shelled and to separate it from the dirt and trash that is carried into the machine along with the stalks.

The invention is illustrated in the accompanying drawings, wherein—

Figure 1 is a central vertical section. Fig. 2 is a top plan view. Fig. 3 is a detail of the vibrating board in the shelled-grain trough on the line 3 3, Fig. 1. Fig. 4 is an elevation of the wind-board at the mouth of the cleaner-fan on the line 4 4. Fig. 5 is a detail showing the means for adjusting the grain-board. Fig. 6 is a detail of the means for adjusting the wind-board. Fig. 7 is a section of Fig. 8 on the line 7 7. Fig. 8 is an enlarged central vertical section. Fig. 9 is a section of Fig. 1 on the line 9 9. Fig. 10 is a section of the same figure on the line 10 10. Fig. 11 is a detail of the end washer of the shredder-head. Fig. 12 is a detail of the same end of the shredder-shaft. Fig. 13 is an elevation of the nut that holds the end washer on the shaft of the shredder. Figs. 14 and 15 are side and edge views of one of the shredder-knives. Figs. 16 and 17 are similar views of one of the intermediate washers of the shredder. Fig. 18 is a plan view of one of the chopping-blades of the shredder-knives. Fig. 19 is a side view of the complete machine, and Fig. 20 is a sectional detail of the snapping-rolls.

The construction of the machine-frame forms no part of the invention and will not, therefore, be described. It may be constructed as illustrated in the accompanying drawings or in any other suitable manner.

At the feed end of the machine a table $a$ is formed, in front of which the operator stands facing the machine, and onto which table he pulls the stalks from a side board or ledge $b$, where they are conveniently deposited by an assistant. At the far end of this table from the operator's stand there is a feed-chute $c$, having an inclined top $d$ and flaring sides $e$. This chute leads to a pair of corrugated rolls $ff$, arranged one over the other, between which rolls the stalks are fed endwise by the operator and by which the ears are snapped off in a manner well understood in this class of machines. The lower one of the snapping-rolls is mounted in fixed bearings on the side rails $gg$ of the machine-frame; but the upper one is carried in bearings in the free ends of arms $hh$, that are extended some distance to the rear and pivoted at their opposite ends, the reel-shaft $i$, by means of which the blower-pipe is raised and lowered, forming a convenient pivot. At their forward ends the arms $hh$ are perforated for the passage of hooks $jj$, that are releasably engaged with eyebolts $kk$, fixed into the side rails $gg$, and in order to hold the upper roll down upon the lower one with an elastic pressure there are spiral springs $ll$, coiled around the hooks between the bars and adjustable nuts at the upper end of the hooks. This arrangement provides a very efficient support for the upper roll and allows either or both ends to yield as may be required by the condition of the stalks, or to admit the passage of foreign bodies that may accidentally be carried in by the stalks. At the same time the adjustment of the springs provides for holding the rolls together with sufficient pressure to feed the stalks through and snap off the ears.

The machine is driven by a belt drawn around a small pulley $a^5$ on the end of the shedder-shaft, and a pinion $a^6$ on the opposite end of the shaft-meshes with a gear $c^6$, which is loose on the shaft of the lower snapping-roll. This gear has a hub $d^5$ provided with internal ratchet-teeth, which are engaged by pivoted dogs that are connected to the roll-shaft, so as to lock and clutch and unclutch the wheel from the shaft. These dogs are controlled by a sliding hood-shaped shipper $e^6$, which is loose on the projecting end of the shaft and has a bell-crank lever $f^6$ connected to it, so that it may be slid in and out on the end of the shaft to release or engage the dogs with the ratchet-teeth on the hub of the wheel $c^6$. The opposite end of the bell-crank $f^6$ is connected, by a rod $g^6$, with the short end of a shipping-lever $h^6$. This lever is pivoted at one corner of the table, where the operator stands, as shown in Fig. 2, so that when the operator reaches over the table so far that there is liability of his hands being caught by the snapping-rolls his body will necessarily come in contact with the lever and release the clutch, thereby stopping the rolls. The lever is normally held by a spring $i^6$ in such position that the wheel $c^6$ is normally clutched to its roll-shaft. In this position the end of the lever stands across the place occupied by the operator, as shown in Fig. 2, so that whenever he accidentally or otherwise assumes a dangerous position with respect to the feeding devices of the machine the lever will be automatically operated and the action of the snapping-rolls will be discontinued. The lower roll is driven by the gear $c^6$ on its shaft, that meshes with the pinion $a^6$ on the shredder-shaft, and the upper roll is driven from a gear $m$ on the same side through the intermediacy of a counter-shaft $o$, having a gear meshing with the gear $m$. The counter-shaft extends across the machine and has a sprocket-wheel $p$ on its other end. A chain $q$ communicates motion from the wheel $p$ to a sprocket-wheel $r$ on the shaft of the upper roll, and in order to keep this chain taut in the bodily movement of the upper roll it is thrown around a sprocket $s$, that is journaled on a stud projecting from the side of an arm $t$, that is pivoted at its upper end to the same windlass-shaft $i$ to which the arms that carry the roll are pivoted. The lower end of the arm $s$ is held over, so as to keep the chain taut, by a rod $u$, that is bolted at one end to the machine-frame and passes through a perforation in the arm and has an expansion-spring $v$, reacting between an adjustable nut on its end and the side of the arm. The peculiar construction of these snapping-rolls is illustrated in Fig. 20. Each roll consists of a pair of shells 2 2 and a solid continuous shaft 3. Near its ends the shafts are each provided with reversely-set screw-threads 4 4, one being right hand and the other left hand, and the ends of the shells are tapped with corresponding internal threads. The shells are about half the length of the shafts, and at their adjacent ends they are provided with small perforations parallel with their axes, into which dowels 5 are adapted to fit. In assembling these shafts and shells each sleeve is first slid over its end of the shaft until their inner ends come nearly together. The dowels are then inserted, and the two sleeves of each roll are then revolved in the same direction until screwed together, and a tight joint is made. Thus it will be understood an extremely light and strong roll is produced which may be easily taken apart and repaired, and the resistance of the rolls when in operation tends constantly to tighten the sleeves upon the shafts. The ears that are snapped off by the rolls $f$ $f$ fall in front of the rolls and are deflected by an inclined shield $w$ onto a pair of husking-rolls $a'$ $a'$ and $b'$ $b'$, these rolls being located parallel with but considerably below the snapping-rolls at the bottom of a box-like receptacle, composed of side boards $c'$ $c'$ and extensions of the side rails $g$ $g$ of the machine-frame. The husking-rolls consist of rectangular metal bars $d'$ let into the surface of disks $e'$, that are secured at intervals on the roll-shafts. The bars $d'$ are spaced apart, so that those of one roll will fit into the spaces between those of the adjacent roll, as best illustrated in Fig. 8, the consequent interlocking of the bars causing the husks to be quickly seized and stripped clean from the ears as they are fed lengthwise along the rolls to a chute $f'$, whence they pass to any convenient receptacle. There are two pairs of these rolls, as shown in Figs. 1 and 8, and they are arranged at opposite sides of the framing forming the husker-box. At one end of this box there is an apron $g'$, and at the other end an inclined apron $h'$ projects into the box, so as to deflect the falling ears onto the center of the husking-rolls. Between the pairs of rolls there is a mid-rib or division-piece $i'$, which divides the bottom of the box in two and prevents the ears from falling down between the pairs of rolls, and for the purpose of feeding the ears toward the discharge-chute $f'$ there is provided a reciprocating forwarder, consisting of teeth or fingers $l'$ $l'$, that are pivoted to the side bars $m'$ $m'$ of a U-shaped frame $n'$, which slides in ways $o'$ $o'$, fastened to the side pieces $c'$ $c'$ of the husker-box. The fingers are free to fold upwardly and ride over the ears lying upon the rolls as the forwarder moves away from the discharge-chute; but they catch the ears and move them slowly and gently along the rolls when the forwarder moves in the opposite direction. The U-shaped frame of the forwarder is connected by a link $p'$ to an arm $q'$, projecting from a rock-shaft that extends along the side of the machine and connects at its opposite end to a rod $r'$, which in turn connects to a wrist on a wheel $s'$ in the lower part of the machine, as best shown in Figs. 9 and 19. The wheel $s'$ is carried by a short shaft $s^2$, that is driven from the shaft $x$ by the cross-belt $s^5$, the shaft $s$, and the bevel-gears $s^3$ and $s^4$, as best shown in Fig. 19. The rotation of the wheel $s'$ reciprocates the forwarder regularly along the husking-rolls, and the ears are thus moved along the rolls at such rate that they are completely stripped of their husks before they drop into the chute. By reducing or increasing the stroke of the forwarder the ears may be allowed to remain on the rolls as long as desired, and in order to prevent the possibility of any ears being thrown out of the far end of the husker-box there is a second apron $t'$, pivoted at its upper edge to the side bars $c'$ $c'$ at that end. The cross-bar of the U-shaped frame of the forwarder is also provided with a depending pusher $u'$, which straddles the mid-rib and serves to push sidewise into the rolls any ears that happen to lodge on it. The individuals of each pair of husking-rolls are intergeared at one end, as shown in Fig. 19, and one roll of each pair is mounted in movable bearings that are elastically held up to the other roll by springs $v'$ $v'$. A chain belt $w'$ passes around sprocket-wheels on the fixed rolls in the manner indicated in Fig. 19, so that the rolls of each pair revolve in the direction of the arrows in Fig. 8. The chain $w'$ is preferably driven by a sprocket on the shaft $x$, on the opposite end of which is a pulley $w^4$, which is belted to a pulley $a^8$ on the shredder-shaft; but it may obviously be driven from any other shaft. In Fig. 19, $y$ denotes a chain-tightener for the chain $w$. The ears having been snapped off the stalks, the latter pass from the rolls $f$ $f$ to the shredder, which, as best shown in Figs. 2 and 7, consists of a shaft $a^2$, having a plurality of interlocked cylindrical washers $b^2$ sleeved upon it and clamping between them at various angles around the periphery of the shredder a number of knives $c^2$. As shown in Figs. 16 and 17, the washers have rims $d^2$, that are connected to hubs $e^2$ by means of spokes $f^2$. The rims are furnished with interlocking projections $g^2$ and are also notched, as shown at $h^2$, to receive the shanks or blades of the knives. The shredder-shaft is provided at one end with a flaring collar $i^2$ and at the other end with a washer $i^{21}$ to prevent the wrapping of the stalks, strings, or shreds around the shaft and clogging its action. The collar $i^2$ at one end of the shaft is held by a set-screw $j^2$, and the washer $i^{21}$ at the other end abuts against the collar $k^2$, that is shrunk on the shaft and is threaded to receive a nut $l^2$ and holds the end washer in place and also makes solid the shredder-knives and intermediate washers. The construction of the shredder-knives is shown in Figs. 14, 15, and 18. They consist of flat steel blades perforated at the center, so as to be slipped over the shaft $a^2$, and having each end serrated and sharpened, as at $m^2$, so that in the revolution of the shredder these radial edges will serve to slit and shred the stalks longitudinally. At their outer ends the blades $c^2$ are bent at right angles, as shown at $n^2$, Figs. 14 and 15, and have their forward edges inclined and sharpened, as shown in Fig. 18, so as to chop up or cut the stalks crosswise into short pieces. The flaring rims to the end washer and collar are arranged to come close to the sides of the machine and have the important office of shedding any stalks, bands, or shredded fodder that may tend to wind itself around the shredder-head at the ends, where the greatest difficulty from this cause would occur. They also serve to guide the same toward the center to be acted on by the knives.

Referring now to Fig. 1, the part $o^2$ is a shaker that extends from end to end of the machine under the husker and shredder. This shaker consists of side boards $p^2$, a headboard $q^2$, and cross-strips $r^2$, $s^2$, and $t^2$. From the headboard to the strip $r^2$ the shaker has an imperforate sheet-metal bottom $u^2$, provided with rows of upstanding teeth $v^2$. From the strip $r^2$ to the strip $s^2$ the bottom of the shaker inclines downwardly, as at $w^2$, and is coarsely perforated, as clearly shown in the drawings, and has underneath it a reticulated screen $x'$ of finer mesh, which also inclines downwardly toward the rear. From the cross-strip $s^2$ to the strip $t^2$ at the rear end of the shaker the floor slopes upward with a slight inclination, as shown at $x^2$, and is also provided with coarse perforations. Underneath the screen $x'$ is a sheet-metal chute $a^3$, which inclines downwardly toward the front of the machine from a cross-strip $b^3$ just under the strip $s^2$, and underneath the upwardly-inclined part $x^2$ of the shaker there is a chute $c^3$, that has a slight downward inclination in the opposite direction to that of the chute $a^3$ and is practically a continuation of the screen $x'$. The shaker is supported at its front end by one or more inclined links $d^3$, that are pivoted at their lower ends so as to oscillate and causing the forward end of the shaker to rise and fall as it is reciprocated by the pitman $e^3$, which is connected at one end to a crank on the rotary shaft $x$ and at the other to the front end of the shaker, so as to cause the material falling on it from above to be carried progressively to the rear into the sphere of action of other parts, to be presently described. At its rear end the shaker rests upon antifriction-rollers $f^3$ at opposite sides of the machine. As will be seen from Fig. 1, the toothed bars $v^2$ of the shaker are extended toward the rear over the perforated part $w^2$ of the floor and under the shredder-head. The object of this arrangement is to more effectually carry the shredded stalks and husks toward the rear of the machine, and to assist this operation there is mounted in the body of the machine at the end of the feed-bars a large toothed drum or beater $g^3$, which is rotated at required speed by means of a chain $h^3$ and sprocket-wheel $i^3$ from the shaft $x$, before referred to. The cut fodder falls from the shredder onto the part $w^2$ of the shaker-bottom and upon the rear ends of the feed-bars, a shield $k^2$ being provided over the shaft $o$ to prevent it from winding around the shaft and help deflect it toward the rear. The speed of the shredder throws the cut fodder rearward, and the further action of the rotary drum and the feed-bars effectually advances it toward the exit end of the machine. The husks that are torn from the ears by the rolls $a'$ $b'$ are also gradually worked rearward by the feed-bars, and any corn that may unavoidably be shelled by the husking-rolls falls upon the imperforate upper end of the shaker-bottom and is worked rearward by the upper and reciprocating movement of the shaker.

The rear of the machine is partly closed by a metallic casing $l^3$, forming a trough-like receptacle into which the shredded stalks and husks are received from the apron $y^2$ of the shaker. At one side of the machine a blower-casing $m^3$ connects with this receptacle, and a fan or blower $n^3$ rotated at a high speed in said casing carries the fodder into a spout $o^3$, whence it may be delivered to any point. The blower-fan is driven by a band $q^3$ from a wheel $r^3$ on the shredder-shaft, and a smaller wheel $s^4$, also on the shaft of the shredder, drives by means of a belt $v^3$ another fan $t^3$, located in a blower-casing $u^3$, situated under the machine. This casing $u^3$ has a mouth $w^3$ terminating at the side edge of a trough $x^3$, that is located under the chute $c^3$, so as to receive the shelled and sifted corn therefrom. The bottom of this trough is inclined, as shown at $a^4$, and at one end it is suspended from an arm $b^4$, that is pivoted to one of the uprights of the machine and is oscillated by a pitman $c^4$, connecting it with a wrist on the wheel $i^3$ of the rotary drum $g^3$. The bottom of the trough is thus oscillated up and down and to and fro at one end, so as to gradually discharge the shelled corn into any suitable receptacle at the side of the machine. The corn falling through the perforated part $w^2$ of the shaker-bottom is received on the screen $x'$, where, by reason of the shaking motion of the screen, it is sifted, and the dirt, &c., falling through the screen is conducted in one direction by the chute $a^3$. The corn continuing on passes onto the chute $c^3$, together with such light trash as could not pass the screen $x'$, and falls over the end of the chute into the trough $x^3$. This trough has an inclined board $d^4$, pivoted to its upper outer edge, and an extensible lip $e^4$ is attached to this board, so as to prevent the corn from being blown or carried beyond the board $d^4$ and to insure its being directed into the trough $x^3$. The means for adjusting the lip $e^4$ is a slot in the board $d^4$ and a thumb-screw, as shown in Fig. 1. The angle of inclination of the board $d^4$ is also adjustable, and in Fig. 5 the means for effecting this is shown to consist of slotted straps $f^4$, pivoted to the board and adjustably clamped to the side of the machine by a thumb-screw. The blower $t^3$ is located and arranged to direct a blast of air across the top of the trough $x^3$, so as to clean the corn of any light dirt or fibers of the stalks and husks that may not have passed through the screen $a^3$. The fan-casing is provided with a hinged top $g^4$ to its mouth $w^3$, and this is made adjustable to diminish or increase the blast by a cranked rod $h^4$, the crank $i^4$ of which hooks at its lower end into a notch-bar $j^4$, pivoted at one side of the machine. There is thus provided a very effective arrangement for separating the shredded fodder from the dirt and other impurities that always pass with the stalks into the machine and also for thoroughly sifting, cleaning, and saving the corn that is unavoidably shelled by the snapping and husking rolls.

I do not herein claim the construction of the shredder-head or the safety devices for preventing the operator from getting his hands caught in the snapping-rolls or any of the other features that are claimed in either of my applications, Serial No. 649,827, filed August 28, 1897, or Serial No. 123,896, filed September 18, 1902.

Having thus described my invention, what I claim is—

1. In a corn husker and shredder, the combination of snapping-rolls, a shredder beyond the rolls, husking-rolls below and in front of the snapping-rolls, and a shaker having an imperforate floor under the husking-rolls, a downwardly-inclined perforated portion beyond, an upwardly-inclined perforated portion beyond the downwardly-inclined part, and chutes extending in opposite directions under said perforated portions.

2. In a corn husker and shredder, the combination of snapping-rolls, a shredder beyond the rolls, husking-rolls below and in front of the snapping-rolls, and a shaker having an imperforate floor under the husking-rolls, a downwardly-inclined perforated portion beyond, an upwardly-inclined perforated portion beyond the downwardly-inclined part, a sieve under the downwardly-inclined part with a reversely-inclined chute under it, a chute under the upwardly-inclined part of the shaker, and a trough for shelled corn under the last-named chute.

3. In a corn husker and shredder, the combination of snapping-rolls, a shredder beyond the rolls, a toothed drum beyond the shredder, husking-rolls below and in front of the snapping-rolls, a shaker having an imperforate floor under the husking-rolls, and a perforated floor under the shredder and toothed drum, oppositely-delivering chutes under the perforated floor, and a receptacle for the shredded stalks and husks beyond the delivery end of the shaker-floor.

4. The combination, to form a snapping-roll, of a shaft having oppositely-threaded portions near its ends, and a pair of cylindrical shells having their ends correspondingly threaded to screw on the threaded portions of the shaft, and means for securing the adjacent ends of the shells together, said means being brought into operation by screwing both shells on the shaft in the same direction.

5. The combination, to form a snapping-roll, of a shaft provided at opposite ends with reversely-arranged threads, and a pair of cylindrical shells having their outer ends provided with similarly-arranged interior threads, the inner ends of the shells being connected together by longitudinal dowel-pins secured in holes in the adjacent ends of said shells by screwing both shells on the shaft in the same direction.

6. The combination of the lower roll $f$ mounted in fixed bearings, the upper roll $f$, pivoted bars $h$ in which said upper roll is mounted, rods $j$ passing through the ends of the bars and hooking into eyes on the frame, springs $l$ encircling the rods above the bars, a sprocket-wheel $r$ on the shaft of the upper roll $f$, a pivoted arm $t$ carrying a sprocket-wheel $s$, and a drive-chain thrown around both the sprocket-wheels and a sprocket-wheel for driving the chain.

7. The combination of the upper roll $f$, bars $h$ in which said roll is mounted, the wheel $r$ on the upper roll-shaft, the drive-shaft $o$ the shaft $i$ on which the bars are pivoted, the wheel $p$ on shaft $o$ the pivoted arm $t$, the chain passing around sprocket-wheels on both roll-shafts and the arm $t$, and around a sprocket-wheel on a spring pressing on the arm to keep the chain taut.

8. The combination with the husking-rolls, of the vibrator comprising side bars guided in ways in the sides of the husker-box, and ear-forwarding fingers pivoted to the side bars so as to fold and pass over the ears on the back stroke of the vibrator.

9. The combination with the husking-rolls of a reciprocating vibrator comprising a frame sliding above the rolls and carrying-fingers to advance the ears along said rolls, and means for reciprocating the frame, the fingers being jointed to the vibrator so as to yield on the backward stroke of the frame, but to be held rigid with the frame on the advancing stroke.

10. The combination with the husker-box of the pairs of husking-rolls at the sides of the box, the mid-rib or division-piece $i'$ between the pairs of rolls, the vibrator having the central pusher $u'$ to sweep said rib and the fingers pivoted at the sides of the vibrator, and working over each pair of rolls.

11. The combination with the fan $l^3$, and the fan-casing $u^3$ having the tangential mouth, of the pivoted flap or door $g^4$, the rod $h^4$ having the crank-arm $i^4$, and the pivoted notched adjusting-bar $j^4$.

12. The combination of the trough $x^3$, the board $d^4$ pivoted thereto, and the lip $e^4$, the angle of the board being adjustable and the lip being adjustably connected thereto so as to slide in or out.

13. The combination of the trough $x^3$, the board $d^4$ pivoted thereto, and adjustable by means of the strap $f^4$ and set-screw, and the lip $e^4$ adjustably connected to the board by a set-screw passing through a slot therein.

In testimony whereof I affix my signature in presence of two witnesses.

CHAS. E. CURTISS.

Witnesses:
  CHAS. N. CHAMBERS,
  W. A. CAVANAUGH.